Oct. 11, 1932.　　　　I. S. HOCKER　　　1,882,013
METHOD OF EXTRACTION OF COCOA BUTTER
Filed Dec. 3, 1928
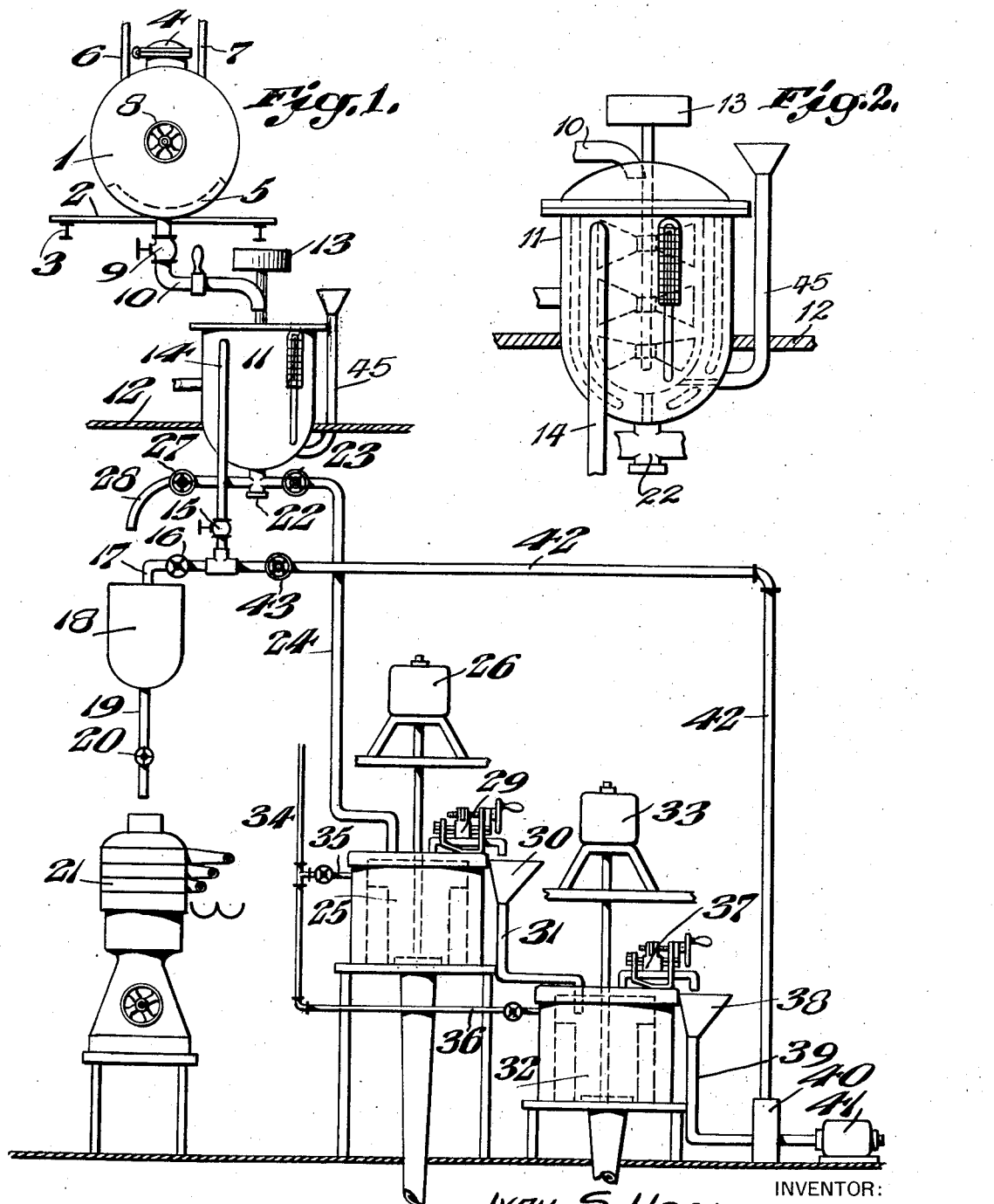
INVENTOR:
IVAN S. HOCKER,
BY
ATTORNEYS.

Patented Oct. 11, 1932

1,882,013

UNITED STATES PATENT OFFICE

IVAN S. HOCKER, OF PHILADELPHIA, PENNSYLVANIA, ASSIGNOR TO THE HOCKER CORPORATION, OF PHILADELPHIA, PENNSYLVANIA, A CORPORATION OF DELAWARE

METHOD OF EXTRACTION OF COCOA BUTTER

Application filed December 3, 1928. Serial No. 323,279.

My invention relates to a new and useful method of the extraction of fats from vegetable matter, such as cocoa butter, from the cacao bean, whereby a more rapid, efficient, and thorough liberation and extraction as well as separation of such fats may be obtained.

In order to carry out my novel method, I have devised a novel arrangement and combination of means to heat an aqueous mixture of the vegetable matter, such as cacao bean or cocoa, while stirring the same, means further to heat the mixture to a temperature sufficient to gelatinize the starch contents thereof and to slowly stir the same while heating, so as to bring the free fat to the surface and to coagulate the same, thus breaking down the emulsion, means to saccharify the starch contents of the mixture, means to draw off from the upper surface of said mixture, the coagulated fat, centrifugal means further and finally to purify and finish the fat thus separated, centrifugal means to separate the fat from the remaining aqueous mixture of saccharified starch and fat, and means to convey the fat thus separated, to the final centrifugal purifying and finishing means, above mentioned.

By means of my novel method and the novel arrangement and combination thereof I am enabled to separate fat from vegetable matter with the minimum amount of handling and labor and also am enabled to effect a separation, far more complete, efficient, and thorough, than has been possible by other means heretofore employed. Moreover, by my novel means, a pure product is obtainable through mechanical means without the aid of any solvent for the fat or any chemical reagent which in any way acts upon or affects the quality of the resulting fat product.

By means of my novel arrangement I am enabled to secure the separation of fat, not only with a greater percentage of purity than is possible by chemical or semi-chemical means or solvent means employed heretofore, but am also able to produce a product which is free of all odor of solvents, and which at the same time may be produced at a cost considerably less than the cost of producing such product with the aid of solvents.

For the purpose of illustrating my invention, I have shown in the accompanying drawing forms thereof which are at present preferred by me, since they will give in practice, satisfactory and reliable results, although it is to be understood that the various instrumentalities of which my invention consists can be variously arranged and organized and that my invention is not limited to the precise arrangement and organization of these instrumentalities as herein shown and described.

Fig. 1 of the drawing represents a diagrammatic view, in elevation, of a novel arrangement and combination of the apparatus embodying my invention.

Fig. 2 is an enlarged view of separating tank 11.

In carrying out my method, I use a horizontally disposed cylindrical cooker 1, supported upon the uppermost platform 2, which is carried by the I beams 3. The cooker 1, is provided with a suitable hinged cover 4, the steam jacket 5 in the bottom thereof, which communicates with the supply and exhaust steam pipes 6 and 7 respectively, and a suitable horizontally and axially disposed stirrer, (not shown in the drawing), of either screw or paddle type, driven by a belt (not shown in the drawing) passing over a suitable pulley 8 carried by one end of the shaft of such stirrer.

Into the cooker 1, I introduce an aqueous mixture of cocoa or crushed cacao bean, and add a suitable amount of salt which serves to coagulate the proteins. A suitable amount of sugar is added to increase the specific gravity of the mixture, thus aiding in the raising of the liberated fat to the surface of the mixture. The proportions of the various materials used may be known to those skilled in the art from a perusal of my prior Patent No. 1,803,615, dated May 5th, 1931, particularly as to the amount of sugar used, which is discretionary, since it only serves to increase the specific gravity of the mixture. The entire mixture is then heated and gently stirred, first, to saturate the cocoa or cacao bean with water to dislodge the free fat, and, second, to gelatinize the starchy contents of the mass. A person skilled in the art, having reference to my Patent No. 1,803,615, of May 5th, 1931, will be able to determine the temperature required, as well as the limit of time for which the mixture is to be heated and stirred. The heated mixture is then discharged through the valve 9 and the pipe 10, into a separator tank 11 supported on the floor 12, somewhat below the platform 2. The separator tank 11 is also provided with suitable steam heating means (not shown in the drawing) and with a vertical stirrer 11x shown in Figure 2 actuated by the pulley 13.

In the separator tank 11, the temperature of the mass is reduced to about 150 degrees F., while stirring slowly with the aid of the vertical stirrer 11x. This operation is continued for a suitable length of time, during which the starch contents of the mixture are gelatinized by the heat of the mixture, while the slow vertical stirring liberates the free fat and tends to raise the same to the surface of the mass.

About 3 lbs. of sodium carbonate is then added to the mass in the tank 11, preferably in the form of an aqueous solution, through a suitable pipe 45, by means of which the sodium carbonate solution is added to the mixture at the bottom of the tank. The sodium carbonate has the dual function of neutralizing any free acids in the mixture and also of liberating carbon dioxide.

The carbon dioxide liberated in the mass rises to the surface and serves further to carry to the surface the liberated fat.

The liberated fat thus raised to the surface of the mass is drawn off through the pipe 14 and the valves 15 and 16 and the pipe 17, into a reservoir 18. From here it is gradually discharged, as required, through the pipe 19 and the valve 20, into a suitable centrifugal purifier or finisher 21.

The mass remaining in the separator tank 11, now contains the proteins, the fibrous matter, the gelatinized starchy constituents, and that portion of the fat content of the original mixture, which is intimately combined with the starchy constituents. Enough cold water is then added to cool the mass to a temperature ranging between 120 and 140 degrees F., and then 3 gallons of malt extract or diastatic enzyme is added. The mass is then stirred at least thirty minutes, until the starchy matter is saccharified and dissolved as a sugar; thereby liberating the remaining fat. Thereafter, the mass, still within the separator tank 11, is heated to about 180 degrees F. and stirred slowly, from one half to one hour and then allowed to stand quiescent for about ten minutes. The fat liberated by the saccharification of the starch, is thus separated on the surface of the mass.

The lower portion of the mass is then drawn off, through the bottom outlet 22, the valve 23, and the pipe 24, into a centrifugal separator 25, of a suitable construction, propelled by a motor 26. The mass is drawn off into the basket of the centrifugal 25 only to the level of the upper layer of fat however. Thereafter the valve 23 is closed and a valve 27 is opened, which allows the upper layer of fat then remaining in the separator tank 11, to run down through the pipe 28 into the reservoir 18 or a similar reservoir. Here the fat is again stored until it is discharged into the purifier or finisher 21.

In the centrifugal 25, the residue or remaining mass from the original charge, in the separator tank 11, is centrifuged until the admixed fat separates out in an inner cylindrical layer, due to the lower specific gravity thereof. The inner layer of fat is drawn off carefully by means of a novel separator nozzle apparatus 29, and discharged into a funnel 30.

From the funnel 30, the fat thus separated, drains through the pipe 31 into a second and similar centrifugal machine 32 driven by the motor 33. Here a further separation of the fatty mixture is obtained. Each of the centrifugal machines 25 and 32 are provided with steam jackets, not shown in the drawings, supplied with steam through the steam pipes 34, 35 and 36, for the purpose of maintaining the same at temperatures sufficient to liquify the fat, and thus to permit a separation thereof.

A novel series of distinct separations are thus effected. First, free fat is separated by heating, stirring and subsequent decantation within the separator tank 11, this fat being drawn off from the top, through the pipe 14 to the reservoir 18. The second separation is the liberation of the physically combined fat and the starchy constituents and is obtained by the saccharification and solution of the starch and the liberation of the fat. The fat thus separated, is drawn off through the bottom outlet 22 and the pipe 28, also into the reservoir 18, after the lower portion or residue, is drawn off through the pipe 23 and the valve 24, into the centrifugal 25. The third separation is a centrifugal separation, and is effected by means of the collecting nozzle 29 and the result of this separation is a fatty mixture of fat and water and residue, which in turn is discharged into a second centrifugal 32 where the last separation is effected of the fatty mixture.

The fat separated from this fatty mixture, in the centrifugal 32, is drawn off through a similar collecting nozzle apparatus 37, into the funnel 38, from where it is conveyed through the pipe 39, into a rotary or centrifugal pump 40, driven by the motor 41. The pump 40 conveys the fat through the pipes 42 and the valves 43 and 16, into the reservoir 18 or a similar reservoir. Thus the last batch of fat separated is again sent through the reservoir 18 into the centrifugal purifier or finisher.

I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having thus described my invention, what I claim as new and desire to secure by Letters Patent is:—

1. The herein described method of extracting cocoa butter, which consists in mixing cocoa or mascerated cacao bean with water to form an aqueous mixture, adding a protein coagulating reagent, subjecting the mixture to a temperature sufficient to melt the fatty constituents and to gelatinize the starchy constituents, horizontally stirring the mixture slowly and continuously, next subjecting the mixture to slow vertical stirring, to liberate the free fat, and finally withdrawing the fat thus liberated from the top of the said mixture.

2. The herein described method of extracting cocoa butter, which consists in mixing cocoa or mascerated cacao bean with water to form an aqueous mixture, adding a protein coagulating reagent, subjecting the mixture to a temperature sufficient to melt the fatty constituents and to gelatinize the starchy constituents, horizontally stirring the mixture slowly and continuously, next subjecting the mixture to slow vertical stirring, to liberate the free fat, next adding a gas producing substance to the bottom of the mixture, and finally withdrawing the fat thus liberated from the top of the said mixture.

3. The herein described method of extracting cocoa butter, which consists in mixing cocoa or mascerated cacao bean with water to form an aqueous mixture, adding a protein coagulating reagent, subjecting the mixture to a temperature sufficient to melt the fatty constituents and to gelatinize the starchy constituents, horizontally stirring the mixture slowly and continuously, next subjecting the mixture to slow vertical stirring, to liberate the free fat, next removing the freed fat, next adding starch saccharifying reagent to render the starchy constituents soluble and to liberate the fat intimately associated therewith, and finally drawing the fat thus liberated from the top of the said mixture.

4. The herein described method of extracting cocoa butter, which consists in mixing cocoa or mascerated cacao bean with water to form an aqueous mixture, adding a protein coagulating reagent, subjecting the mixture to a temperature sufficient to melt the fatty constituents and to gelatinize the starchy constituents, horizontally stirring the mixture slowly and continuously, next subjecting the mixture to slow vertical stirring, to liberate the free fat, next removing the freed fat, next adding starch saccharifying reagent to render the starch constituents soluble and to liberate the fat intimately associated therewith, next adding a gas producing substance to the bottom of said mixture, and finally withdrawing the fat thus liberated from the top of the said mixture.

IVAN S. HOCKER.